United States Patent [19]

Keenan

[11] Patent Number: 5,258,176

[45] Date of Patent: * Nov. 2, 1993

[54] KAIROMONAL LURE FOR ECTOPARASITIC INSECT TRAP

[76] Inventor: F. Edward Keenan, 2185 Tierra Verde Rd., Vista, Calif. 92084

[*] Notice: The portion of the term of this patent subsequent to Mar. 17, 2009 has been disclaimed.

[21] Appl. No.: 843,249

[22] Filed: Feb. 28, 1992

Related U.S. Application Data

[63] Continuation-in-part of Ser. No. 677,071, Mar. 29, 1991, Pat. No. 5,095,648, and a continuation-in-part of Ser. No. 516,091, Apr. 27, 1990, Pat. No. 5,029,411.

[51] Int. Cl.⁵ .................. A01N 25/00; A01M 1/02
[52] U.S. Cl. .................................... 424/84; 43/133; 43/134
[58] Field of Search .................................. 424/84

[56] References Cited

U.S. PATENT DOCUMENTS

| | | | |
|---|---|---|---|
| 787,037 | 5/1905 | Hackett | 119/87 |
| 1,005,443 | 10/1911 | Luckett | 43/136 |
| 3,708,908 | 1/1973 | Levey | 43/122 |
| 4,052,811 | 10/1977 | Shuster | 43/116 |
| 4,279,095 | 7/1981 | Aasen | 43/139 |
| 4,425,733 | 1/1984 | Ammon | 43/115 |
| 4,551,941 | 11/1985 | Schneidmiller | 43/122 |
| 4,599,823 | 7/1986 | Lee | 119/91 |
| 4,815,232 | 3/1989 | Rawski | 43/136 |
| 4,907,366 | 3/1990 | Balfour | 43/114 |
| 4,979,673 | 12/1990 | Wilk | 424/84 |

FOREIGN PATENT DOCUMENTS 2835737  3/1980  Fed. Rep. of Germany ........ 43/136

OTHER PUBLICATIONS

Brody Enterprises–Jun. 1990 Catalog p. 3.

Primary Examiner—Allen J. Robinson
Assistant Examiner—John D. Pak
Attorney, Agent, or Firm—Henri J. A. Charmasson

[57] ABSTRACT

A kairomonal lure for use in combination with a ectoparasitic insect trap, particularly flea and tick traps, simulates the presence of a potential host animal. The lure comprises a heat source and a semiochemical substance.

1 Claim, 1 Drawing Sheet

KAIROMONAL LURE FOR ECTOPARASITIC INSECT TRAP

PRIOR APPLICATION

This is a continuation-in-part of Ser. No. 07/677,071 filed Mar. 29, 1991, now U.S. Pat. No. 5,095,648, which is a continuation-in-part of application Ser. No. 07/516,091 filed Apr. 27, 1990, now U.S. Pat. No. 5,029,411.

BACKGROUND OF THE INVENTION

This invention relates to the prevention, identification and control of insect pests and ectoparasites, and more specifically to the non-toxic extermination of fleas, ticks and other blood-seeking insects.

FIELD OF THE INVENTION

Ectoparasites such as the cat flea, and the rat flea and ticks have been a scourge since the dawn of humanity. Not only can they cause unbearable discomfort to both humans and animals, they also carry diseases including bubonic plague still endemic in many parts of the United States. Ticks are no less of a nuisance or danger since as a vector, they carry and can transmit a number of tick fevers, including Lyme disease to humans. Flea and tick control is commonly achieved by chemical products whose toxicity can have adverse consequences not only on individuals affected with allergies, but also on the entire environment. Man is beginning to learn some bitter lessons from excessive use of DDT, chlorodane and numerous other pesticides in the control of fleas, ticks and other insects in previous decades, and also from the high toxicity of sites where domestic and industrial wastes have been dumped. Yet there is no effective non-toxic means to control flea and tick infestations. It is therefore imperative to avoid any abuse of pesticides and to use them only when, and to the extent necessary. Due to the ubiquitous character of fleas and ticks people tend to impute to them any bite or other suspicious redness of the skin. Pesticides are often sprayed indiscriminately to vast areas, often far beyond what would be necessary to eliminate the culprit.

Pest control personnel called in to treat an allegedly infested are a a have no practical means to collect samples of the suspected pest in order to determine their proper identity and extent of infestation. They end up spraying often indiscriminately with highly toxic substances formulated to kill a broad spectrum of insects, when in fact a limited application of a more specific and/or benign chemical would have sufficed.

Traditionally, domestic as well as agricultural pest control has been performed using a single neurotoxic insecticide strategically applied where the insects are active. It is expected that the insects will make contact with the insecticide and that the poisonous chemical will disrupt their nervous systems.

A non-chemical, or at least non-detrimental to the environment method must be predicated upon a different strategy. Insects such as the flea and tick pupate away from the host animal and must depend on a variety of host-finding, sensory abilities in order to acquire the blood-meal necessary to their growth, survival or reproduction. Some insects like fleas and ticks are extraordinarily sensitive to host-related stimuli, both mechanical and semio-chemical.

Semiochemical effects occur between organisms of all types, including ticks and fleas. Sensitivity to the chemical environment and interaction between biological species of the animal kingdom has always played a critical role in the survival of the species. Semiochemical studies of insects have been undertaken in response to the economic imperative to find a more effective, less polluting means of controlling agricultural insects. (See Eric S. Albone and Stephen G. Shirley Mammalian Semio-Chemistry-The Investigation of Chemical Signals Between Mammals, John Wiley & Sons, Ltd. 1983.) The understanding of some insects semio-chemistry has offered the possibility of a simple chemical means of controlling, or at least monitoring, populations of related insect pests on a specific basis using small quantities of natural pheromonal substances. There are now numerous pheromonal attractants marketed to the agricultural industry. While pheromonal pest management techniques are now significant in the field of agriculture, little is known about semiochemicals as kairomonal attractants between differing species e.g. insect-mammal. It is known that cat fleas, ctenocephalides felis can identify and locate the cat, the dog and even a human person, but passes rabbits and pigs. Dog fleas, ctenocephalides canis are attracted by dogs, rabbits and humans, but passes up the cat. The human flea, pulex irritans can identify and attack humans, rabbits, pigs and even the burrowing owl. The very same selectivity holds true for the tick family, Ixodidae, according to Arnold Mallis, Handbook of Pest Control, Franzak & Foster Co., 1990. It is clear that the survival of ticks, fleas and other blood-seeking pests depends on their ability to sense and respond to specific mammalian chemicals and other types of kairomonal attractants in their environment.

SUMMARY OF THE INVENTION

The instant invention addresses the problem presented by an indiscriminate and widespread use of highly toxic pesticides in our environment for the treatment of bug infested living areas by providing a safe and non-polluting lure for traps used for collecting or eradicating the offending ectoparasites. The lure is based on a study of various semiochemicals, including natural animal and plant substances, which are combined with a heat source in order to mimic the presence of a potential, warm-blooded animal host for a variety of ectoparasites.

DESCRIPTION OF THE PREFERRED EMBODIMENT OF THE INVENTION

Figure 1:
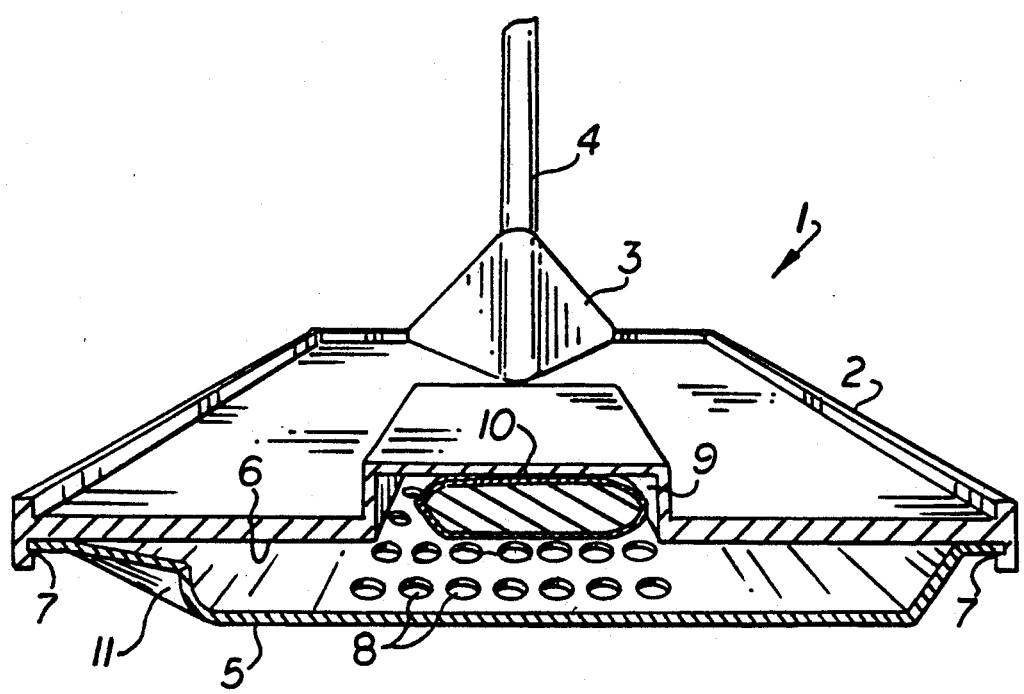
FIG. 1 is a perspective view of a cut-away kairomonal insect trap according to the invention.

The hypothesis leading to the present invention was that of the major semiochemical sources, namely the skin, the specialized scent glands and microbial scent sources associated with mammals, urine, the secretions of the reproductive tract, certain blood factions, and others associated with breath and saliva should prove to contain semiochemicals capable of eliciting a definite, tactical behavioral response from related parasitic species.

A study of literature yielded the compilations listed in Tables 1-4.

TABLE 1

| COMMON FLEA AND TICK SPECIES | PREFERRED ANIMAL HOST | | | |
|---|---|---|---|---|
| | CAT | DOG | FOX | HUMAN |
| Cat flea, Ctenocephalides felis | X | X | X | X |
| Dog flea, Ctenocephalides canis | | X | | X |
| Human flea, Pulex irritans | X | X | X | X |
| Ticks, (Family, Ixodidae) | | X | X | X |

TABLE 2

| SEMIO-CHEMICAL | SOURCE: | | | | LOCATION |
|---|---|---|---|---|---|
| | CAT | DOG | FOX | HUMAN | |
| (1) felinine | X | | | | cat urine |
| (2) ammonium carbonate | X | X | X | X | urine/breath |
| (3) isovaleric acid | X | X | X | X | anal sac |
| (4) acetic acid | X | | X | | anal sac |
| (5) phenylacetic acid | X | | X | | anal sac |
| (6) isobutyric acid | X | | X | | anal sac |
| (7) 5-aminovaleric acid | X | X | X | | anal sac |
| (8) nepetalactone | X | | X | | scent gland |
| (9) DL-2-hydroxycaproic acid | X | | X | | sebum |
| (10) 2-hydroxyisobutyric acid | X | | | | sebum |
| (11) L-lactic acid | | | | X | sweat gland |
| (12) 5a-androst-16-en-3-ol | | | | X | sweat gland |

TABLE 3

| NATURAL SCENTS | LOCATION |
|---|---|
| (13) Cat (domestic) | urine |
| (14) Bobcat | urine |
| (15) Lion | urine |
| (16) Red fox | urine |
| (17) Oppossum | urine |

Table 1 indicates the affinity of three types of fleas and the tick family, Ixodidae to a variety of hosts.

Table 2 lists a number of semiochemical elements which are found in various flea and tick hosts, and their source.

Table 3 lists some natural semiochemicals.

In a first series of experiments, a mixture of ethanol and a 1% per volume mixture of one of each semiochemical listed in Table 2 was sprayed in a 6 centimeter circular pattern to the point of run-off, and allowed to dry on a approximately 20×20 centimeter collection board coated with a tacky substance capable of entrapping the contacting insect. In each case, the collection board was passed, face down, over areas known to be infested with various types of fleas. The experiments conducted at room temperature of approximately 24 degrees celsius and for five minutes each, resulted in a small number of fleas jumping toward the collection board and being entrapped in the tacky substance.

A chemical source of heat achieving temperatures of approximately 50 degrees celsius was then mounted behind the center of the collection board, and the experiment was conducted in the absence of any semiochemical spray on the board. A slightly increased number of fleas were collected. However, when the heat source was combined with each one of the semiochemical solutions, a significantly larger number of fleas were collected that were heavily concentrated over the center of the collection board where the semiochemical had been sprayed over the area of the heat source.

Further experiments were then run with the heated collection board sprayed first with each one of the semiochemicals listed in Table 2 then with various combinations of solutions each containing one of the substances listed in Tables 2 and 3, each time using the heat source. The results were consistent with those obtained in the second experiment, indicating that the combination of heat source and any of the semiochemical substances and natural scents created a powerful kairomonal attraction. The best results, i.e., the largest number of fleas, were collected with the following combination: In a base of 12 milliliters (ml) of ethanol (95% ethyl alcohol), 18 ml. cat urine, 12 ml. fox urine, 6 ml. bobcat urine, 6 ml. lion urine, the following semiochemicals were added: 1 ml. isovaleric acid, 1 ml. 2-hydroxyisobutyric acid, 1 ml. of a 70% solution of catnip extract (nepeta cataria), and 12 ml. of a 50% solution of ammonium carbonate. Catnip, nepeta cataria extract is known to contain nepetalactone and acetic, butyric and valeric acid.

One can therefore conclude that while each semiochemical element as well as the heat source used separately can act as kairomonal attractant, the combination of heat and one or more of these elements is synergistically more powerful. The heat source appears to enhance the semiochemical emanations. The combination of semiochemicals also enhance their kairomonal effect mimicking to the insect an even more attractive opportunity for a blood meal.

The trap 1 used throughout the previously discussed experiments consists essentially of a quadrangular tray 2 about 20×20 centimeters. A bracket 3 along one side engages a broom handle 4. A cardboard 5 is applied against the under surface 6 of the tray, and is kept in place by a peripheral groove 7. The collection board 5 is shown with perforations 8 about its central area. A central cavity 9 in the tray houses a chemical heat pack 10 of a type readily available on the market. The heat pack contains chemicals which when brought together or exposed to atmospheric oxygen, create an exothermic reaction which achieves temperatures in a range from 30 degrees celsius to 60 degrees celsius. The reaction which lasts for several minutes or even hours is initiated by either squeezing the pack and thus breaking an internal barrier between the reacting components, or removing a seal and thus exposing the reacting components to the air. A sheet 11 which is covered with a tacky substance is bonded to the underside surface of the board 5. The trap is designed to be passed slowly about 20 centimeter above an area suspected to be infested with fleas or other ectoparasites, or may have the handle removed and left stationary, face up, in known infested areas of ectoparasities, such as fleas and ticks.

What is claimed is:

1. A kairomonal lure for ectoparasite insect trap which comprises:
   a chemical heat pack that achieves temperatures in a range from 30 degrees Celsius to 60 degrees Celsius; and
   an effective among of a semiochemical selected from the group consisting of isovaleric acid, phenylacetic acid, 5-aminovaleric acid, DL-2-hydroxycaproic acid, 2-hydroxyisobutyric acid and L-lactic acid.

* * * * *